H. B. & F. A. PICKETT.
FERTILIZER CHEMICAL AND COMPOSITE DISTRIBUTER.
APPLICATION FILED NOV. 15, 1915.

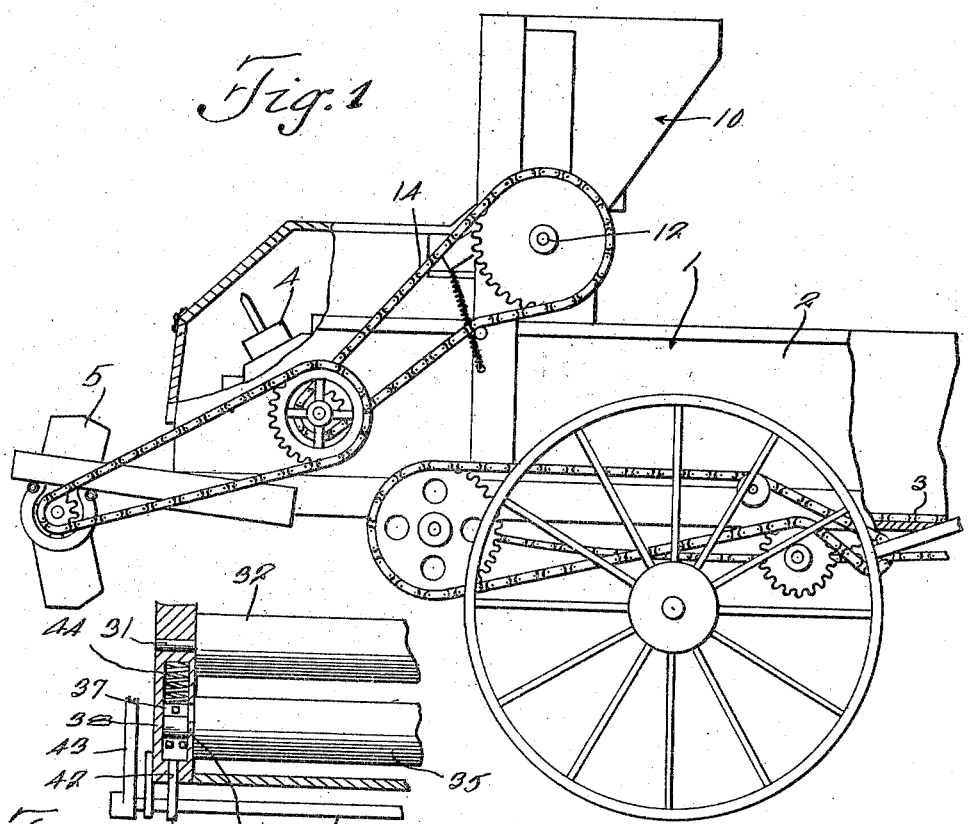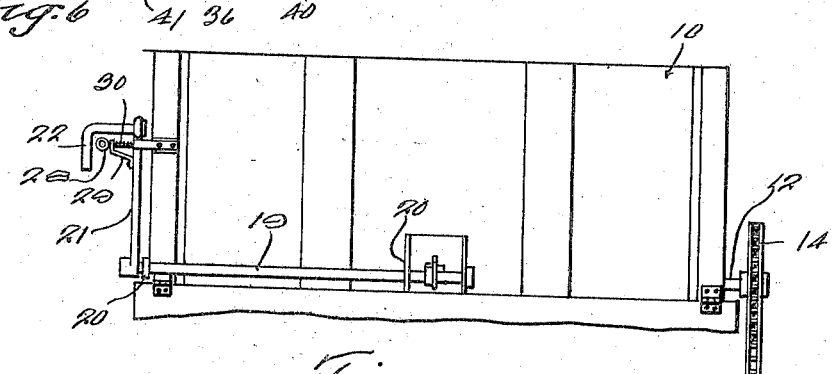

1,275,736.

Patented Aug. 13, 1918.
2 SHEETS—SHEET 2.

Witnesses
Chas. H. Trotter.
Rob. Meyer.

Inventors
H. B. Pickett
& F. A. Pickett
By N. Randolph Jr.
Attorney

UNITED STATES PATENT OFFICE.

HURDIE B. PICKETT AND FREDERICK A. PICKETT, OF BALTIMORE, MARYLAND.

FERTILIZER CHEMICAL AND COMPOSITE DISTRIBUTER.

1,275,736.

Specification of Letters Patent. Patented Aug. 13, 1918.

Application filed November 15, 1915. Serial No. 61,575.

*To all whom it may concern:*

Be it known that we, HURDIE B. PICKETT and FREDERICK A. PICKETT, citizens of the United States, residing at Baltimore, in the State of Maryland, have invented certain new and useful Improvements in Fertilizer Chemical and Composite Distributers; and we do hereby declare the following to be a full, clear, and exact description of the invention, such as will enable others skilled in the art to which it appertains to make and use the same.

This invention relates to a device for distributing fertilizer chemicals or composites, and is an improvement over and companion to the chemical treating manure mixer, pulverizer and distributer set forth in the application filed March 27th, 1915, Serial No. 17440.

The primary object of this invention is to provide a device for chemically treating farm or stable manure, peat, deteriorated straw, hay or other analogous fertilizing material for increasing the fertilizing proclivities of the manure to render the same highly efficient for increasing the strength and growth of various types of agricultural products and further to provide a distributer as specified, which may be applied to any ordinary type of manure spreader for chemically treating the manure prior to its distribution by the spreader.

Another object of this invention is to provide means for regulating the quantity of chemicals or composite distributed or deposited upon the manure, and to further provide a graduated scale for co-action with the quantity regulating means whereby said means may be set for depositing a predetermined amount of chemicals or composite upon the fertilizer.

With the foregoing and other objects in view this invention consists in such novel features of construction, combination and arrangement of parts as will be hereinafter more fully described, illustrated in the accompanying drawings and claimed.

Figure 2:
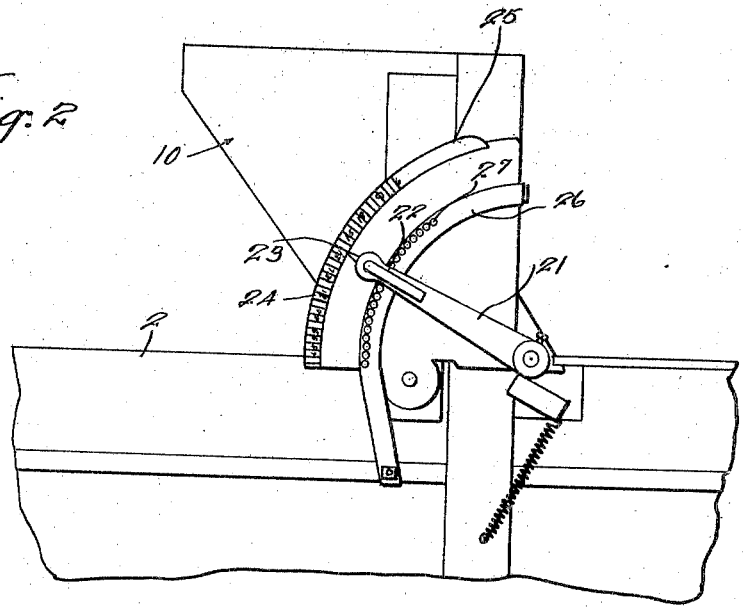
Figure 4:
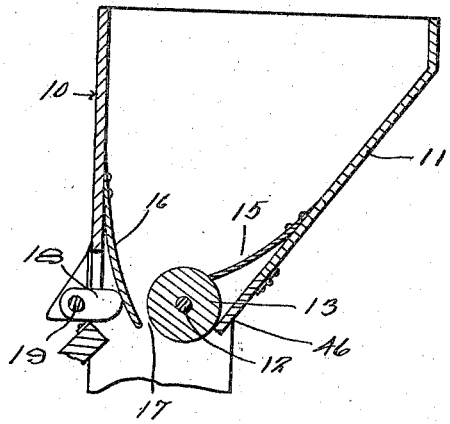
Figure 5:
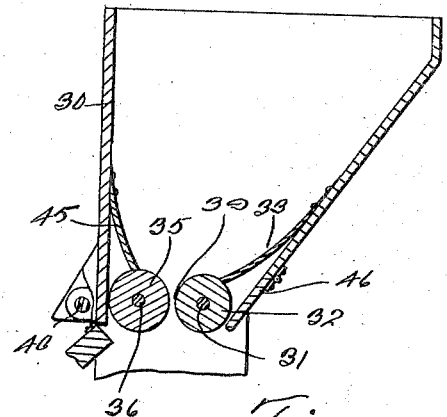

In describing the invention in detail reference will be had to the accompanying drawings wherein like characters designate like and corresponding parts throughout the several views, and in which:

Figure 1 is a side elevation of the rear end of a manure spreader, showing parts of the spreader broken away, and illustrating the improved chemical distributer applied thereto, Fig. 2 is an end elevation of the chemical distributer, Fig. 3 is a rear view of the chemical distributer, Fig. 4 is a cross section through the chemical distributer, Fig. 5 is a cross section through a modified form of the chemical distributer, and Fig. 6 is a fragmentary horizontal section through the modified form illustrated in Fig. 5.

Referring more particularly to the drawings, 1 designates the manure spreader as an entirety, which may be of any ordinary or desired type of spreader including a manure retaining box 2, a conveyer 3, manure pulverizing means 4 and distributing means 5. While a particular form of manure spreader is illustrated in Fig. 1 of the drawings, it is to be understood, that the chemical distributer, which will be hereinafter more fully described and claimed, may be used upon any desired type of manure spreader without departing from the spirit of this invention.

The chemical and composite distributer includes a hopper 10, which is supported by the box 2 of the manure spreader and which has its forward side or wall 11 inclined so that the fertilizer chemical or composite will travel downwardly along the same. The shaft 12 is rotatably supported by the lower end of the hopper 10 and extends longitudinally through the same. A chemical or composite distributing roller 13 is mounted upon the shaft 12, which shaft and roller are rotated in any suitable manner, such as the sprocket and chain construction illsutrated at 14 in Fig. 1 of the drawings. A plate 15 is attached to the inner surface of the wall or side 11 of the hopper and extends downwardly therein, having its lower edge positioned above the roller 13 for preventing the chemicals or composite from falling behind the roller 13. A spring metal plate 16 is attached to the inner surface of the wall opposite of the wall or side 11 and projects downwardly therein, having its lower end positioned alongside the roller 13. The plate 16 is provided for regulating the space, indicated at 17, through which the fertilizing chemical or composite travels for deposit upon the manure within the box 2. A cam 18 is mounted upon a rod 19 and the cam engages the outer surface of the spring plate 16 for moving the plate inwardly toward the roller upon different positions of the cam. The resiliency of the plate will cause it to spring outwardly away from the roller 13, upon outward movement of the cam 18. The shaft 19 is rotatably supported by suitable bearing brackets 20 exteriorly of the hopper 10 and it extends from the transverse center of the hopper to and beyond one end of the same. The end of the rod 19 which projects beyond the end of the hopper 10 has a lever 21 attached thereto, to the upper end of which lever an angled handle 22 is attached. The lever 21 has an indicating finger 23 attached to and projecting outwardly from its outer end, which indicating finger is adapted for co-action with graduations 24, which are formed upon a segmental or arcuate plate 25. The graduations 24 represent pounds of chemical or composite deposited by the roller 13 upon a predetermined quantity of manure. A second arcuate plate or bar 26 is provided, which bar has a plurality of perforations 27 extending therethrough. The perforations correspond to the graduations 24. A pin 28 is slidably supported by a bracket 29, which bracket is carried by the lever 21. The pin 28 extends through the lever and is adapted for seating in any one of the openings or perforations 27 for holding the lever 21 in various adjusted positions. A spring 30 is coiled about the pin 28 and tends to hold it in its inward position within one of the perforations or openings 27, at all times, and the pin must be withdrawn from the openings against the tension of the spring 30. The cam 18 is positioned on the inner end of the rod 19 substantially at the transverse center of the hopper 10. The cam 18 is formed so that it will move the plate 16 for regulating the size of the opening or space 17 for depositing a quantity of chemicals represented by the graduation 24 at which the indicating finger or hand 23 points, thereby providing means whereby a predetermined quantity of fertilizer chemical or composite may be deposited upon each load of manure distributed by the manure spreader.

In Figs. 5 and 6 a modified form of the chemical or composite distributer is shown. The modified form includes a hopper 30, constructed identically with the hopper 10, having a shaft 31 extending therethrough which corresponds to the shaft 12 and has a roller 32 mounted thereupon, which roller corresponds to the roller 13. The roller 32 may be rotated in any suitable manner for distributing the chemical or composite from the hopper 30 upon the manure. A plate 33 is also provided which prevents the chemicals or the composite from falling back of the roller 32. In lieu of the plate 16 a roller 35 is provided. The roller 35 is mounted upon a shaft 36 which is supported by bearing boxes 37. The bearing boxes 37 are slidably supported by the ends 38 of the hopper 30 for permitting of movement of the roller 35 toward or from the roller 32 for regulating the size of the space 39, between the rollers 32 and 35, through which the chemical or composite passes for deposit upon the manure. A rod 40 is rotatably supported exteriorly of the hopper 30 and it has cams 41 mounted thereon, which extend through openings 42 formed in the ends 38. The cams 41 engage the bearing boxes 37 for moving them inwardly upon the rotation of the shaft 40 by the actuation of the lever 43, which is mounted upon one end of the rod. The lever 43 corresponds to the lever 21 shown in the preferred form of the invention. The clamping spiral springs 44 are positioned within the openings in the ends 38, and bear against the inner ends of the bearing boxes 37 for forcing them outwardly when relieved from the inward pressure of the cams 41. A plate 45 is provided, which extends outwardly over the upper edge or surface of the roller 35 for preventing the chemicals or composite from falling back of the roller 33.

In each of the hopper constructions 11 and 30, the lower edge of the forward angled walls are separated to form hingedly supported scrapers 46, which are positioned for scraping chemicals from the rollers 13 and 32, which might adhere to the rollers during the distribution of the chemicals or composite. It is perferable to provide a spring hinge which will hold the scrapers 46 in engagement with the rollers at all times.

The distributing roller 13 and the plate 16 will coact, during the distribution of the chemicals or composites upon the manure, for pulverizing the chemicals or composites, or in other words for crushing chunks or clogs of the chemicals or composites prior to the depositing of the chemicals or composite upon the manure. The rollers 32 and 35, will co-act in the same manner, thereby eliminating the liability of depositing chunks of the chemicals or composite upon the manure.

The improved distributer may be attached to any desired type of manure spreader, for depositing fertilizing chemicals or composites upon the manure prior to distribution.

From the foregoing description, taken in connection with the accompanying drawings the advantages of construction and of the method of operation of the improved fertilizer chemical and composite distributer, will be readily apparent to those skilled in the art to which this invention appertains, and, while in the foregoing description, the principle of operation of this invention has been described together with various features of construction, it is to be understood that certain minor features of construction, combination and arrangement of parts may be altered to suit practical conditions provided such alterations are comprehended within the scope of what is claimed.

What we claim is:

1. The combination with a manure spreader including a conveyer delivering manure to a beater, of means to deposit dry chemicals upon manure prior to action upon the manure by the beater.

2. The combination with a manure spreader including a conveyer delivering manure to a beater, of means to deposit dry chemical upon manure prior to action upon the manure by the beater and to effect an even distribution of the chemicals over the entire load.

3. The combination with a manure spreader including a conveyer delivering manure to a beater, of depositing means to effect an even distribution of dry chemicals over the entire load.

4. The combination with a manure spreader including a conveyer delivering manure to a beater, of depositing means to effect an even distribution of dry chemicals over the entire load prior to action upon the manure by the beater, and to pulverize the chemicals prior to deposit upon the load.

5. The combination with a manure spreader including a conveyer delivering manure to a beater, of depositing means to effect an even distribution of dry chemicals over the entire load prior to action upon the manure by the beater, and controlling means to regulate said depositing means whereby a predetermined quantity of chemicals may be deposited upon a load of manure.

6. The combination with a manure spreader including a conveyer delivering manure to a beater, of depositing means to effect an even distribution of dry chemicals over the entire load prior to action upon the manure by the beater, and to pulverize the chemicals prior to deposit upon the load, and controlling means to regulate said depositing means whereby a predetermined quantity of chemicals may be deposited upon the load of manure.

7. The combination with a manure spreader including a conveyer delivering the manure to a beater, of depositing means to effect an even distribution of dry chemicals over the entire load prior to action upon the manure by the beater, and to pulverize the chemicals prior to deposit upon the load, and means to prevent the accumulation of dry chemicals upon said depositing means.

8. The combination with a manure spreader including a conveyer delivering the manure to a beater, of depositing means to effect an even distribution of dry chemicals over the entire load prior to action upon the manure by the beater, and to pulverize the chemicals prior to deposit upon the load, means to prevent the accumulation of dry chemicals upon said depositing means, and controlling means to regulate said depositing means whereby a predetermined quantity of chemicals may be deposited upon a load of manure.

9. The combination with a manure spreader including a conveyer delivering manure to a beater, of means to deposit dry chemicals upon manure prior to action upon the manure by the beater to effect an even distribution of the chemicals over the entire load and to pulverize chemicals prior to deposit upon the load.

10. The combination with a manure spreader including a conveyer delivering manure to a beater, of means to deposit dry chemicals upon manure prior to action upon the manure by the beater to effect an even distribution of the chemicals over the entire load, and to pulverize the chemicals prior to deposit upon the load, and means to prevent the accumulation of the dry chemicals upon said pulverizing means.

11. The combination with a manure spreader including a conveyer delivering manure to a beater, of means to deposit dry chemicals upon manure prior to action upon the manure by the beater, controlling means to control the deposit of the chemicals, said depositing means and said controlling means coacting to pulverize the chemicals prior to the deposit of the chemicals upon the manure.

12. The combination with a manure spreader including a conveyer delivering manure to a beater, of means to deposit dry chemicals upon manure prior to action upon the manure by the beater, controlling means to regulate the deposit of the chemicals, said depositing means and said controlling means coacting to pulverize chemicals prior to deposit of the chemicals upon the manure, and regulating means to regulate said controlling means whereby a predetermined quantity of chemicals may be deposited upon a load of manure.

13. The combination with a manure spreader including a conveyer delivering manure to a beater, of depositing means to effect an even distribution of dry chemicals over the entire load prior to action upon the manure by the beater, controlling means to regulate the deposit of the chemicals, said depositing means and said controlling means coacting to pulverize the chemicals prior to the deposit of the chemicals upon the manure, and means to prevent the accumulation of the chemicals upon said depositing means.

14. The combination with a manure spreader including a conveyer delivering manure to a beater, of means to deposit dry chemicals upon manure prior to action upon the manure by the beater, including a retaining hopper, a rotary distributing roller carried by said hopper, adjustable means positioned within the hopper for regulating the quantity of chemicals distributed by the roller, said roller arranged to effect an even distribution of the chemical over the entire load of manure.

15. The combination with a manure spreader including a conveyer delivering manure to a beater, of means to deposit dry chemicals upon manure prior to action upon the manure by the beater, including a retaining hopper, a rotary distributing roller carried by said hopper, adjustable means positioned within said hopper for regulating the quantity of chemicals distributed by the roller, said roller arranged to effect an even distribution of the chemical over the entire load of manure, and scraping means carried by said hopper and engaging said depositing roller to prevent accumulation of chemicals upon the roller.

16. The combination with a manure spreader including a conveyer delivering manure to a beater, of means to deposit dry chemicals upon the manure prior to action upon the manure by the beater, including a retaining hopper, a rotary depositing roller carried by said hopper, adjustable means positioned within the hopper for regulating the quantity of chemicals distributed by the roller, said roller arranged to effect an even distribution of the chemical over the entire load of manure, and regulating means to regulate said quantity controlling means whereby a predetermined quantity of chemical may be deposited on a load of manure.

17. The combination with a manure spreader including a conveyer delivering manure to a beater, of means to deposit dry chemicals upon manure prior to action upon the manure by the beaters, including a retaining hopper, a rotary distributing roller carried by said hopper, adjustable means positioned within the hopper for regulating the quantity of chemical distributed by the roller, said roller arranged to effect an even distribution of the chemical over the entire load of manure, scraping means carried by said hopper and engaging said depositing roller to prevent accumulation of chemical upon the roller, and controlling means for regulating said quantity controlling means whereby a predetermined quantity of chemicals may be deposited upon a load of manure.

18. The combination with a manure spreader including a conveyer delivering manure to a beater, of means to deposit dry chemicals upon the manure to effect an even distribution of the chemicals over the entire load of manure, including a retaining hopper, a rotary distributing roller carried by said hopper, adjustable means positioned within the hopper for regulating the quantity of chemicals distributed by the roller, a portion of one side of said hopper hinged to the hopper, and means for holding said hinged portion in engagement with the roller to prevent accumulation of chemicals upon the roller.

19. The combination with a manure spreader including a conveyer delivering manure to a beater, of means to effect an even distribution of dry chemicals over the entire load of manure including a retaining hopper, a rotary distributing roller carried by said hopper, adjustable means positioned within the hopper for regulating the quantity of chemicals distributed by the roller, regulating means to regulate said quantity controlling means whereby a predetermined quantity of chemicals may be deposited upon a load of manure, a portion of one side of said hopper hinged to the hopper, and means for holding said hinged portion in engagement with the roller to prevent accumulation of chemicals upon the roller.

In testimony whereof we affix our signatures in presence of two witnesses.

HURDIE B. PICKETT.
FREDERICK A. PICKETT.

Witnesses:
MARY M. MAGRAN,
MARY E. UPMAN.

Copies of this patent may be obtained for five cents each, by addressing the "Commissioner of Patents, Washington, D. C."